H. J. GELBERT.
PULLEY.
APPLICATION FILED JUNE 8, 1903
1,010,613.
Patented Dec. 5, 1911.
2 SHEETS—SHEET 1.
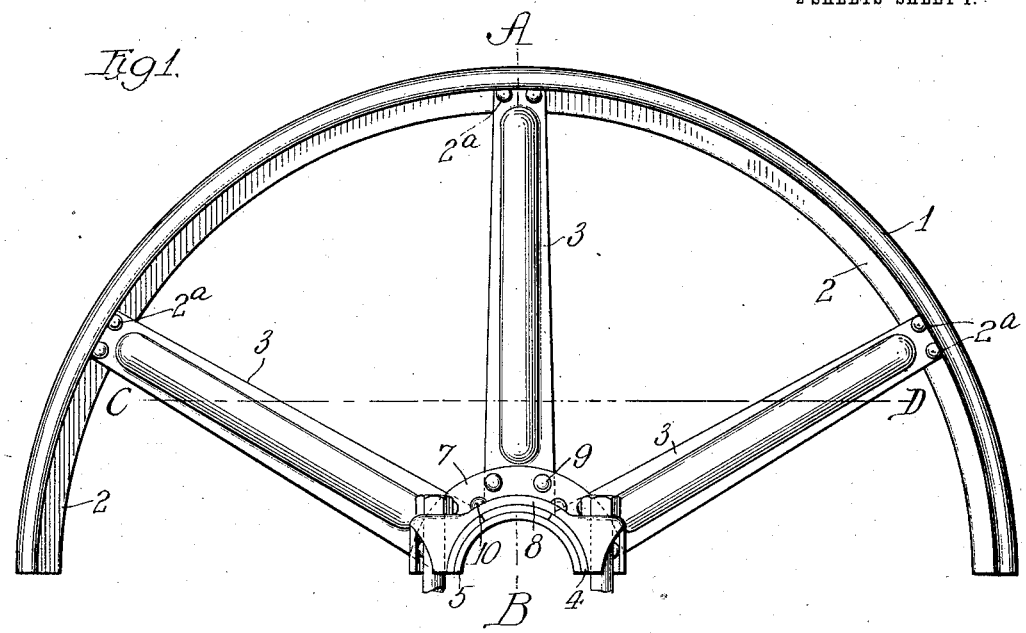
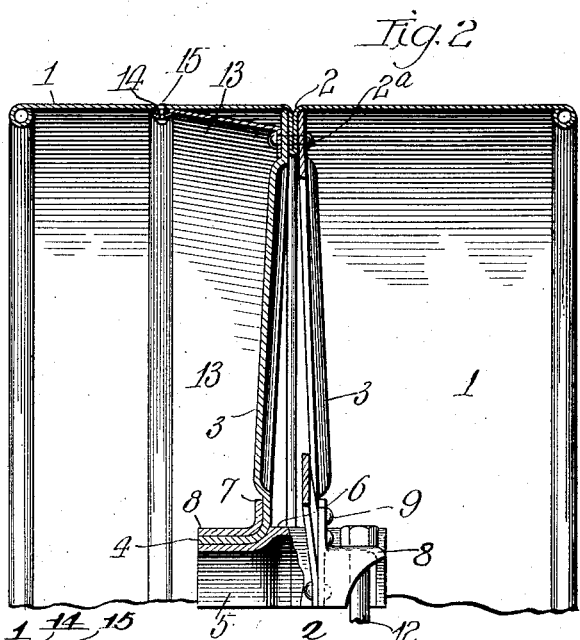
Witnesses
Harold S. Barrett
Edward R. Barrett
Inventor
Henry J. Gilbert
By Rector & Hibben
His Attys.

H. J. GILBERT.
PULLEY.
APPLICATION FILED JUNE 8, 1903.
1,010,613.
Patented Dec. 5, 1911.
2 SHEETS—SHEET 2.
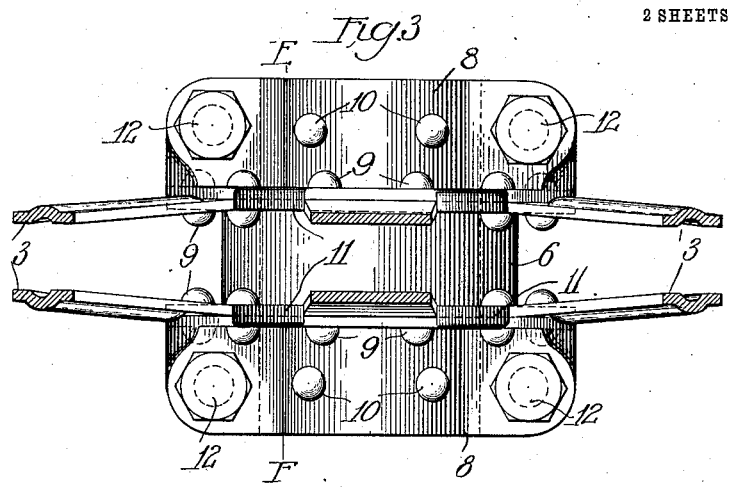
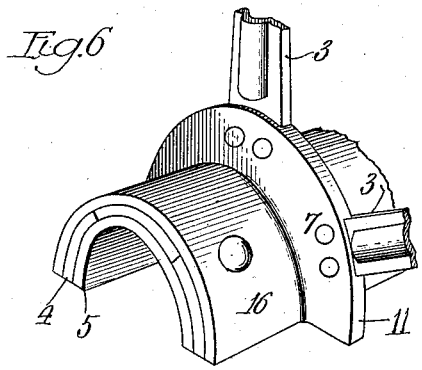
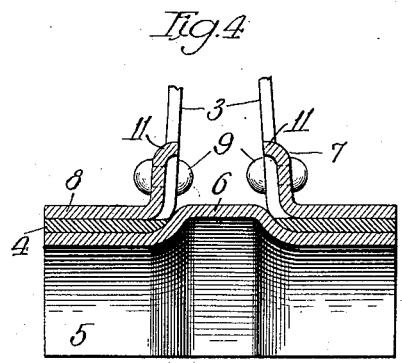
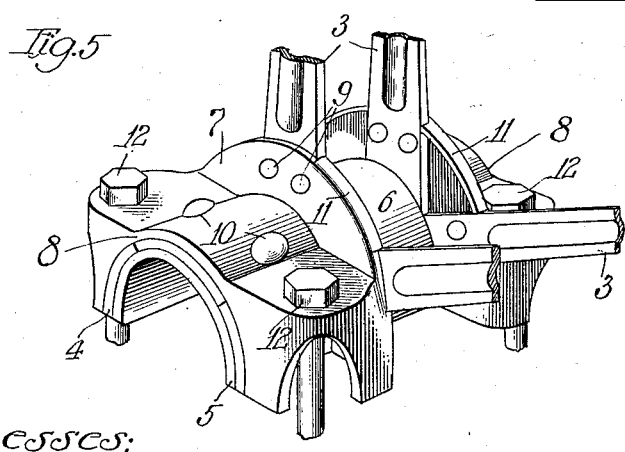
Witnesses;
Harold J. Barrett
Edward R. Barrett
Inventor
Henry J. Gilbert
By, Rector & Hibben
His Atty.

UNITED STATES PATENT OFFICE.

HENRY J. GILBERT, OF SAGINAW, MICHIGAN.

PULLEY.

1,010,613.   Specification of Letters Patent.   Patented Dec. 5, 1911.

Application filed June 8, 1903. Serial No. 160,521.

*To all whom it may concern:*

Be it known that I, HENRY J. GILBERT, residing at Saginaw, Michigan, have invented certain new and useful Improvements in Pulleys, of which the following is a specification.

My invention has relation to pulleys or wheels, more particularly but not necessarily to the split or sectional type, and the object thereof is to provide a pulley made of sheet metal, which pulley shall be comparatively light but strong in construction and durable and efficient in practical use.

The features of novelty and utility will be apparent from the description hereinafter given.

My invention may be embodied in a solid wheel or pulley or in a split or sectional pulley, but for convenience I will describe my invention as applied to a pulley of the latter type.

In the drawings, Figure 1 is an elevation of one section or half of a pulley embodying my invention; Fig. 2 a sectional elevation on line A—B of Fig. 1; Fig. 2ª a detail view of the peripheral bead 14; Fig. 3 a sectional plan on line C—D of Fig. 1; Fig. 4 a section on line E—F of Fig. 3; Fig. 5 a perspective of the hub portion of one of the pulley sections; and Fig. 6 a perspective of a modified form of construction.

In the present instance, the pulley comprises essentially a rim, of the split type, spokes and a hub portion, constructed and arranged in a novel manner, as hereinafter explained. As shown, the rim 1 has its central portion inwardly rolled and doubled upon itself to form an annular web 2 upon the inner face of the rim, to afford means of attachment for the outer ends of the spokes. The spokes 3, arranged in pairs, are made of sheet metal and preferably provided with longitudinal ribs to secure strength. The outer ends of these spokes are secured in suitable manner to the annular web 2 of the rim, as by rivets 2ª, while the inner ends are bent or turned outwardly to form hub flanges 4, constituting a portion of the hub structure. These hub flanges extend at substantially right angles from the spokes and lie in a plane parallel with the axis of the rotation of the pulley. Within the hub pieces or flanges of the spokes is arranged a split or divided hub member or thimble 5 adapted to fit upon the shaft. This hub member is centrally circumferentially expanded to form the raised portion 6 adapted to project slightly in the space between the two sets of spokes at their base or inner ends, whereby the latter are braced and held the proper distance apart. However, this particular construction, while preferable, is not essential, inasmuch as the hub member might be made straight.

The pulley is arranged to be clamped upon a shaft by means of two sets of sectional clamps adapted to fit over the hub pieces 4 and clamp or draw together by bolts 12 the corresponding hub pieces of the two halves or sections of the pulley. Each section of a clamp comprises, in the present instance, a semi-circular plate 7 and an outwardly directed flange 8, of semi-circular shape to fit upon the outer face of the hub pieces 4. The spokes are secured at their inner ends to this plate 7 in suitable manner, as by rivets 9, and likewise the flange 8 is secured to the hub piece and hub thimble or sleeve by rivets 10, or otherwise. The clamp plate 7 is provided with alternating notches and with projecting arc-shaped portions or tongues 11 corresponding with the spokes and spaces therebetween. These tongues are folded over inwardly between the spokes as shown in Figs. 3, 4 and 5 for the purpose of bracing them and relieving them of torsional strain, whereby a strong and extremely rigid pulley is obtained.

In case it be found desirable to brace the rim and the outer end of the spokes, a brace 13 may be employed, and the same may comprise a continuous web or ring, as shown, or a series of arms, arranged obliquely between the rim and the spokes and secured to such parts. In the present instance, the rim, intermediate its margin and web 2, is rolled or grooved inwardly to form the peripheral bead 14 on the inner face of the rim and the outer or upper end or edge of the brace is correspondingly curved to fit such bead.

The brace, herein shown as a continuous web, is secured at one end to the bead of the rim in suitable manner, as by the rivets 15, whose outer heads are contained within the peripheral bead, whereby injury to the belt is avoided. The lower or inner end of the brace is secured to the spokes and to the web 2 by the same rivets 2ª which secure the latter parts together. When the brace is in the form of arms, it is flanged at its inner end, but when in the form of a continuous web or ring the inner edge may be cut or slit on opposite sides of the spokes and tongues thereby formed bent inwardly and secured to the spokes.

The plate 7, instead of constituting a part of the clamp, may be formed separate therefrom as shown in Fig. 6, wherein such plate is provided with a semi-circular flange 16 fitting upon or surrounding the hub ends of the spokes. The pulley sections of this construction may be clamped together by ordinary sectional clamps fitting over the flange 16.

I claim:

1. A pulley comprising a rim, a series of separate spokes connected therewith at their outer ends and outwardly flanged at their inner ends, a hub thimble upon which the inner ends of the spokes rest or fit, plates secured to the spokes on the outer substantially radial sides thereof and having outwardly directed flanges fitting upon the inner ends of the spokes, and means for clamping the thimble, spokes and plates together, substantially as described.

2. A pulley comprising a rim, a series of separate spokes connected therewith at their outer ends and outwardly flanged at their inner ends, a hub thimble upon which the inner ends of the spokes rest or fit, plates secured to the outer substantially radial sides of the spokes and having a series of tongues inwardly turned between the spokes, each of said plates having an outwardly directed flange fitting over the flanged ends of the spokes, and means for clamping the thimble, spokes and plates together; substantially as described.

3. A pulley comprising a rim, a series of spokes connected therewith at their outer ends and outwardly flanged at their inner ends, and sectional clamps, each clamp section consisting of a substantially radial plate secured to one side of the spokes and provided with an outwardly directed flanged portion fitting upon the inner ends of the spokes, fastening means extending through said plates and spokes for securing them together and means for securing the clamp sections together; substantially as described.

4. A pulley comprising a rim, a series of spokes connected therewith at their outer ends and outwardly flanged at their inner ends, and sectional clamps, each clamp section consisting of a substantially radial and semi-circular plate secured to one side of the spokes and provided with an outwardly directed flanged portion secured to the flanged ends of the spokes, fastening means extending through said plates and spokes for securing them together, and bolts passing through said clamp sections for securing the clamp sections together; substantially as described.

5. A pulley comprising a rim, a series of spokes connected therewith at their outer ends and outwardly flanged at their inner ends, and sectional clamps, each clamp section consisting of a substantially semi-circular plate secured to one side of the spokes and having on its outer edge a series of arc-shaped tongues which are inwardly turned between the inner ends of the spokes, said plate having an outwardly directed flange secured to the hub portion of the spokes, and means for securing the clamp sections together; substantially as described.

6. A pulley comprising a rim infolded at its central portion to form a web 2, a series of spokes connected at their outer ends to said web and outwardly flanged at their inner ends to form a part of the hub structure, substantially semi-circular plates secured to one side of the spokes and having on their outer edges a series of tongues which are inwardly turned between the inner ends of the spokes, said plates having outwardly-directed flanges secured to the hub portion of the spokes, a hub thimble arranged within the hub portion of the spokes, and means for clamping together the parts of the hub; substantially as described.

7. A pulley comprising a rim having an inwardly-extending web, a series of spokes secured at their outer ends to such web, means for supporting the inner ends of such spokes and a brace which is continuous circumferentially and extends from a point near the inner edge of the web outwardly and laterally to the rim and is connected to the latter; substantially as described.

8. A pulley comprising a rim having an inwardly-extending web, a series of spokes secured at their outer ends to such web and shaped at their inner ends to form a hub and a brace which is continuous circumferentially to form a ring and is secured at one end to the web and at the other to the rim intermediate its web and one of its edges, said brace extending at an angle to said rim and its web; substantially as described.

9. A pulley comprising a rim having an inwardly extending web and also having a peripheral groove forming a bead, a series of spokes secured at their outer ends to such web, and a brace secured at one end to the web and at the other to said bead; substantially as described.

10. A pulley comprising a rim having an inwardly extending web and also having a peripheral groove forming a bead, a series of spokes secured at their outer ends to such web, and a brace having one end or edge secured to the web and having its opposite end or edge curved or grooved to fit said bead and secured thereto; substantially as described.

11. A pulley comprising a rim, a series of spokes connected therewith at their outer ends and outwardly flanged at their inner ends to form a hub, a hub thimble having a central expanded portion arranged between the inner ends of the spokes, and clamping mechanism for clamping the hub and thimble together and secured to the body of the spokes.

12. The combination of a rim 1 having an infolded web 2, spokes 3 each having a hub portion 4 outwardly flanged parallel to the axis of rotation, a hub thimble 5 having an expanded portion 6 arranged between the inner ends of the spokes, a semicircular plate 7 secured to the spokes and having an outwardly directed flange 8 fitting upon and secured to the hub terminal 4, there being tongues 11 projecting from the plate 7 and folded over inwardly between the spokes, and means for clamping together the parts of the hub structure; substantially as described.

13. A sectional pulley formed of sheet metal, each section comprising a rim portion, a series of spokes connected therewith at their outer ends and outwardly flanged at their inner ends to form a part of the hub structure, a hub thimble having a circumferential expanded portion within the inner ends of the spokes, a semi-circular plate secured to the outer side of the spokes and having an outwardly directed flange fitting over the flanged ends of the spokes and secured to such spokes, and bolts for clamping together the hub portions of the two pulley sections; substantially as described.

14. A sectional pulley formed of sheet metal, each section comprising a rim portion inwardly rolled at its central portion to form a web 2, a series of spokes secured at their outer ends to said web and outwardly flanged at their inner ends to form a part of the hub structure, a hub thimble arranged within the inner or flanged ends of the spokes and having a circumferential expanded portion between the ends of the radial portions of such spokes, a semicircular plate having an outwardly directed flange portion fitting over said flanged ends of the spokes, and means for clamping together the hub portions of the two pulley sections; substantially as described.

15. A pulley comprising a rim having an inwardly-extending web, a series of spokes secured at their outer ends to such web, means for supporting the inner ends of such spokes, and a brace which is in the form of a ring and extends from the edge of the web diagonally to a point on the rim intermediate one of its edges and the web; substantially as described.

16. A pulley comprising a rim having an inwardly-extending web, a series of spokes secured at their outer ends to such web, means for supporting the inner ends of such spokes, a brace which is continuous circumferentially to form a ring and extends from the web to the rim, and rivets passing through the brace, spokes and web for fastening such parts together; substantially as described.

17. A pulley comprising a rim having an inwardly extending web, a series of spokes secured at their outer ends to such web, means for supporting the inner ends of such spokes, and a brace extending from the web to the rim and consisting of a band or ring secured at its edges to the rim and web respectively; substantially as described.

18. A pulley comprising a rim having an inwardly extending web, a series of spokes secured at their outer ends to such web, means for supporting the inner ends of such spokes, and a brace extending from the web to the rim and consisting of a band or ring having its inner edge inwardly flanged and secured to the web and having its outer edge secured to the rim; substantially as described.

19. A pulley comprising a rim having an inwardly extending web and also having a peripheral groove forming a bead, a series of spokes secured at their outer ends to such web, means for supporting the inner ends of such spokes, and a brace extending from the web to the rim and consisting of a continuous band or ring having its inner edge inwardly flanged and secured to the web and having its outer edge grooved to fit such bead and secured thereto; substantially as described.

20. A pulley comprising a rim having a web 2, a series of separate spokes connected at their outer ends to said web and outwardly flanged at their inner ends to form a hub portion, curved plates having a portion fitting against the radial parts of the spokes and secured thereto and having right angled flanges fitting upon and secured to the flanged ends of the spokes; substantially as described.

21. A pulley comprising a rim having an inwardly extending web, a series of spokes secured at their outer ends to such web, means for supporting the inner ends of such spokes, and a brace secured to said web and extending diagonally and laterally therefrom and secured to the rim, said brace coöperating with a plurality of spokes; substantially as described.

22. A split pulley comprising a two part rim each having an inwardly extending web, a series of spokes secured at their outer ends to such webs, means for supporting the inner ends of such spokes and two continuous semi-circular braces, one for each pulley half, each brace extending from its web laterally to the rim; substantially as described.

HENRY J. GILBERT.

Witnesses:
S. E. HIBBEN,
LOUIS B. ERWIN.

Copies of this patent may be obtained for five cents each, by addressing the "Commissioner of Patents, Washington, D. C."